US009125350B1

(12) United States Patent
Dunn

(10) Patent No.: US 9,125,350 B1
(45) Date of Patent: Sep. 8, 2015

(54) PIVOTALLY COLLAPSIBLE GREEN HOUSE

(71) Applicant: Hayden Dunn, Hayden, CO (US)

(72) Inventor: Hayden Dunn, Hayden, CO (US)

( * ) Notice: Subject to any disclaimer, the term of this patent is extended or adjusted under 35 U.S.C. 154(b) by 0 days.

(21) Appl. No.: 14/552,621

(22) Filed: Nov. 25, 2014

(51) Int. Cl.
| A01G 9/16 | (2006.01) |
| A01G 9/14 | (2006.01) |
| E04H 15/38 | (2006.01) |
| E04H 15/40 | (2006.01) |

(52) U.S. Cl.
CPC ............... *A01G 9/14* (2013.01); *A01G 9/1407* (2013.01); *A01G 9/16* (2013.01)

(58) Field of Classification Search
CPC ..... A01K 31/00; A01K 31/007; A01K 39/00; A01K 31/06
USPC .......................................................... 119/429
See application file for complete search history.

(56) References Cited

U.S. PATENT DOCUMENTS

| 3,161,231 | A | * | 12/1964 | Dawson et al. | ............... 160/132 |
| 3,812,616 | A | | 5/1974 | Koziol | |
| 3,906,968 | A | * | 9/1975 | Black | ............... 135/132 |
| RE31,465 | E | * | 12/1983 | Robichaud | ............... 135/133 |
| 4,809,592 | A | | 3/1989 | Caldwell | |
| 5,179,798 | A | | 1/1993 | Sonagere | |
| 5,605,007 | A | | 2/1997 | Hinsperger | |
| 5,746,237 | A | * | 5/1998 | Arnic | ............... 135/88.06 |
| 5,813,169 | A | | 9/1998 | Engerman | |
| 5,842,495 | A | * | 12/1998 | Egnew et al. | ............... 135/133 |
| 6,185,877 | B1 | | 2/2001 | Lloyd | |
| 6,349,732 | B1 | * | 2/2002 | Cooper | ............... 135/133 |
| D642,701 | S | * | 8/2011 | Howard | ............... D25/15 |
| D643,131 | S | * | 8/2011 | Howard | ............... D25/15 |
| D659,587 | S | | 5/2012 | Willsie | |
| 2007/0295380 | A1 | * | 12/2007 | Glaeser | ............... 135/133 |
| 2008/0256854 | A1 | * | 10/2008 | McIlvenna | ............... 47/29.5 |
| 2009/0151242 | A1 | | 6/2009 | Kellogg | |
| 2010/0122490 | A1 | | 5/2010 | Stewart | |
| 2011/0047868 | A1 | | 3/2011 | Mudegowda | |
| 2013/0125946 | A1 | * | 5/2013 | Bourdon | ............... 135/121 |

FOREIGN PATENT DOCUMENTS

CN     202127668 U     2/2012

* cited by examiner

*Primary Examiner* — Kristen C Hayes

(57) ABSTRACT

The pivotally collapsible greenhouse is a portable greenhouse that comprising a collapsible frame and a cover. The collapsible frame comprises five nested struts that are nested that pivot around a center shaft. Once expanded, the collapsible frame is covered in a transparent material.

9 Claims, 3 Drawing Sheets

PIVOTALLY COLLAPSIBLE GREEN HOUSE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and horticulture, more specifically, a collapsible greenhouse for use in protecting plants from the elements.

SUMMARY OF INVENTION

The pivotally collapsible greenhouse is a portable greenhouse that comprises a collapsible frame and a cover. The collapsible frame comprises five nested struts that are nested that pivot around two center shafts. Once expanded, the collapsible frame is covered in a transparent material.

These together with additional objects, features and advantages of the pivotally collapsible greenhouse will be readily apparent to those of ordinary skill in the art upon reading the following detailed description of the presently preferred, but nonetheless illustrative, embodiments when taken in conjunction with the accompanying drawings.

In this respect, before explaining the current embodiments of the pivotally collapsible greenhouse in detail, it is to be understood that the pivotally collapsible greenhouse is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pivotally collapsible greenhouse.

It is therefore important that the claims be regarded as including such equivalent construction insofar as they do not depart from the spirit and scope of the pivotally collapsible greenhouse. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
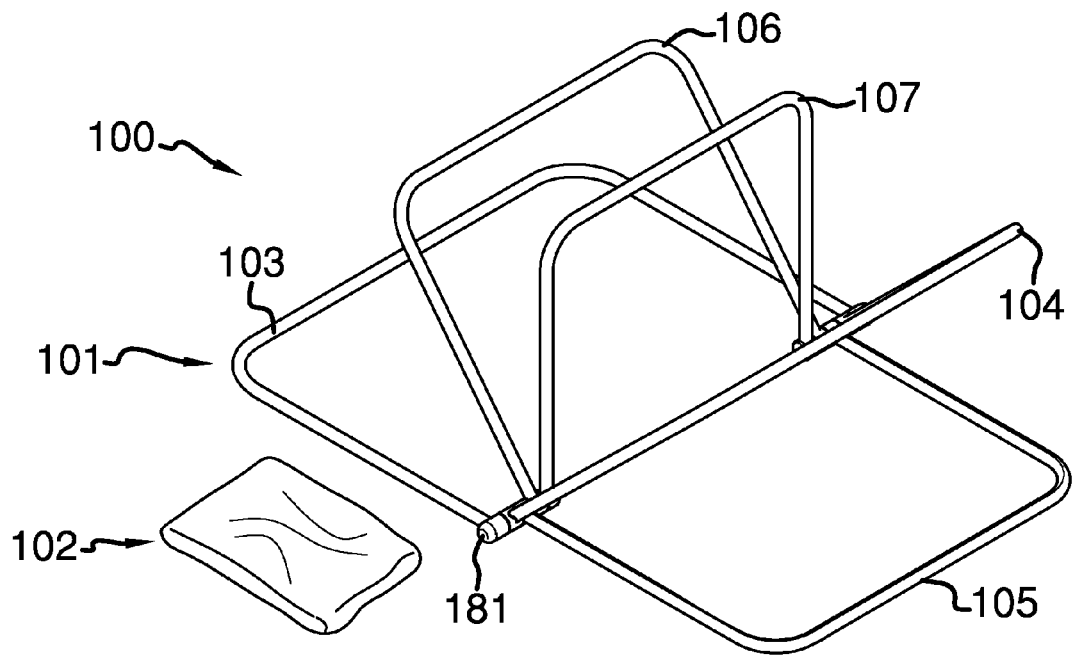
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The pivotally collapsible greenhouse 100 (hereinafter invention) is a portable greenhouse that comprising a collapsible frame 101 and a cover 102 and a means to attach the cover 102 on the collapsible frame 101.

The cover 102 comprises sheeting that acts as a barrier that is adapted to protect plants 119 contained within the invention 100 from the surrounding environment. Depending on the needs of the region, the cover 102 can be transparent to allow full sunlight into the greenhouse or it can be tinted to reduce or block the sunlight being received. Materials suitable for use in sheeting include, but are not limited to, commercially available plastic sheeting or textile fabrics.

The purpose of the collapsible frame 101 is to provide a structure upon which the cover 102 can be mounted. This provides a protective physical space 124 within which plants 119 will be protected from the elements.

The collapsible frame 101 comprises a plurality of U shaped posts 120, and a plurality of hinges 121. The plurality of U shaped posts 120 can be further defined as a first U shaped post 103, a second U shaped post 104, a third U shaped post 105, a fourth U shaped post 106, and a fifth U shaped post 107. The plurality of hinges 121 can be further defined as a first hinge 108, a second hinge 109, a third hinge 110, a fourth hinge 111, fifth hinge 112, sixth hinge 113, seventh hinge 114, eighth hinge 115, ninth hinge 116, tenth hinge 117.

Each of the plurality of U shaped posts 120 is made of tubing that is formed roughly in the shape of a flat arch with rounded corners. Each of the plurality of U shaped posts 120 has a first end 171 and a second end 172. Each of the plurality of U shaped posts 120 may be formed as a single piece or may be formed from three straight shafts joined with corner pieces. Each of the plurality of U shaped posts 120 may be made from, but not are not limited to, commercially available aluminum, copper, or polyvinylchloride pipes and fittings.

Figure 3:
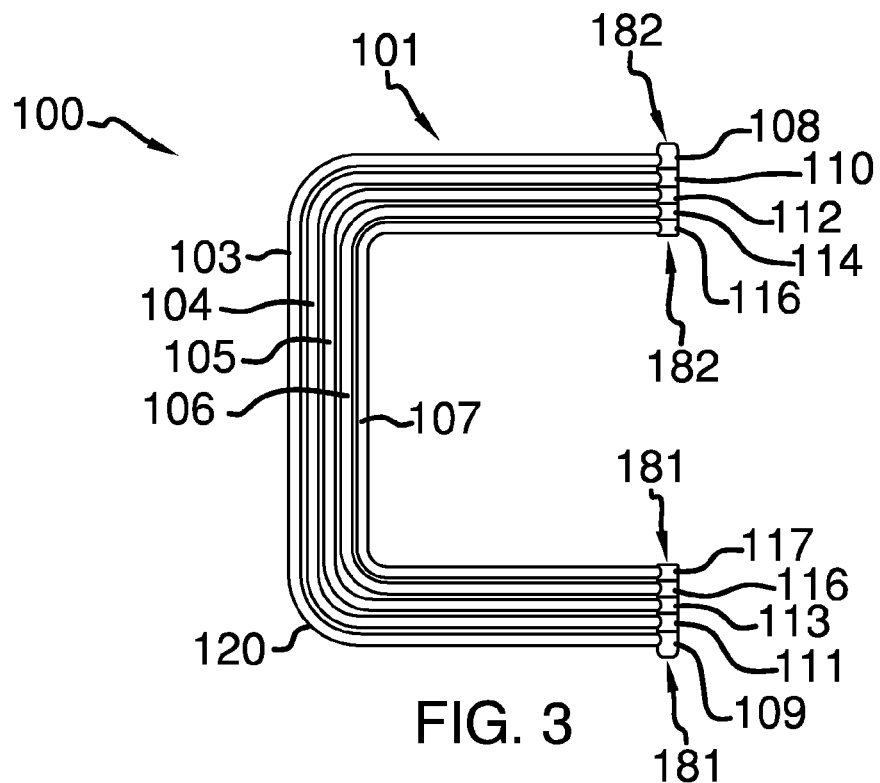
FIG. 3 is an alternate top view of an embodiment of the disclosure.

The length of each of the plurality of U shaped posts 120 is the distance along the tubing from the first end 171 to the second end 172 of each U shaped post 120. The length of the first U shaped post 103 is greater than the length of the second U shaped post 104, which is greater than the length of the third U shaped post 105, which is greater than the length of the fourth U shaped post 106, which is greater than the length of the fifth U shaped post 107. The differences in lengths allow the plurality of U shaped posts 120 to nest within each other as shown in FIG. 3. This allows for easy storage and transportation of the invention 100.

The first end 171 of each of the plurality of U shaped posts 120 is attached to one of the plurality of hinges 121. The second end 172 of each of the plurality of U shaped posts 120 is attached to a corresponding one of the plurality of hinges 121. Methods for attachment include, but are not limited to: 1) screwing the each end of each of the plurality of U shaped posts 120 into a threaded hole provided as part of each of the plurality of hinges 121; or, 2) inserting each end of each of the plurality of U shaped posts 120 into a collar 175 provided with each of the plurality of hinges 121 and then tightening each collar 175 to hold the end of the individual U shaped posts in place.

The purpose of the plurality of hinges 121 is to allow the plurality of U shaped posts 120 to rotate around a first shaft and a second shaft 182. Optionally, governing devices can be incorporated into each of the plurality of hinges 121 to limit the range of motion of each of the plurality of U shaped posts 120 so that each of the plurality of U shaped posts 120 can only move between the storage position and working position.

Each of the plurality of hinges 121 are comprised of a pivoting joint that allows for rotational motion around the first shaft 181 and the second shaft 182. Devices and methods suitable for use in providing the plurality of hinges 121 include, but are not limited to, using a plumbing tee fitting or using commercially available bearings or hinges.

If optional governing devices are used, methods to implement this would include, but are not limited to, selecting a hinge device with a limited range of motion or the addition of protrusions that would act as physical stops once the appropriate range of motion had been achieved.

Once the plurality of U shaped posts 120 are moved in position, they can be held in place by locking the plurality of hinges 121 in place. Methods to do this include, but are not limited to, using the optional governing devices or fitting the plurality of hinges 121 with screws that screw into first shaft 181 and the second shaft 182 to hold the plurality of hinges 121 in place.

The first shaft 181 is a pipe around which half of the plurality of hinges 121 are mounted. The purpose of the first shaft 181 is: 1) to hold the half of the plurality of hinges 121 in position relative to each other; and, 2) to act as a pivot point around which the half of the plurality of hinges 121 will rotate. The first shaft 181 may be made from, but not are not limited to, commercially available aluminum, copper, or polyvinylchloride pipes.

The second shaft 182 is a pipe around which half of the plurality of hinges 121 are mounted. The purpose of the second shaft 182 is: 1) to hold the half of the plurality of hinges 121 in position relative to each other; and, 2) to act as a pivot point around which the half of the plurality of hinges 121 will rotate. The second shaft 182 may be made from, but not are not limited to, commercially available aluminum, copper, or polyvinylchloride pipes.

Several means are available to secure the cover 102 to the collapsible frame 101 including, but not limited to, the following examples. Example 1: if the cover 102 is significantly larger than the collapsible frame 101, the cover 102 can simply be placed over the collapsible frame 101 and held in place using rocks or other weights. Example 2: clips, such as laundry clips or even large binder clips may be used to physically attached cover 102 to the plurality of U shaped posts 120. Example 3: The cover 102 may be formed, sized and fitted to tightly fit over the collapsible frame 101 and the perimeter of the cover 102 can be fitted with elastic webbing to securely hold the cover 102 tightly to the collapsible frame 101.

Detailed reference will now be made to a first potential embodiment of the disclosure, which is illustrated in FIGS. 1-6.

The first potential embodiment is comprised of: a first U shaped post 103, a second U shaped post 104, a third U shaped post 105, a fourth U shaped post 106, a fifth U shaped post 107, a first hinge 108, a second hinge 109, a third hinge 110, a fourth hinge 111, fifth hinge 112, sixth hinge 113, seventh hinge 114, eighth hinge 115, ninth hinge 116, tenth hinge 117, first shaft 181, second shaft 182, and the cover 102.

As shown most clearly in FIG. 3, the first end of the first U shaped post 103 is attached to the first hinge 108. The second end of the first U shaped post 103 is attached to the second hinge 109. The first end of the second U shaped post 104 is attached to the third hinge 110. The second end of the second U shaped post 104 is attached to the fourth hinge 111. The first end of the third U shaped post 105 is attached to the fifth hinge 112. The second end of the third U shaped post 105 is attached to the sixth hinge 113. The first end of the fourth U shaped post 106 is attached to the seventh hinge 114. The second end of the fourth U shaped post 106 is attached to the eighth hinge 115. The first end of the fifth U shaped post 107 is attached to the ninth hinge 116. The second end of the fifth U shaped post 107 is attached to the tenth hinge 117.

The first hinge 108, third hinge 110, fifth hinge 112, seventh hinge 114, and ninth hinge 116 pivot around the first shaft 181. The second hinge 109, fourth hinge 111, sixth hinge 113, eighth hinge 115, and tenth hinge 117 pivot around the second shaft 182.

Figure 2:
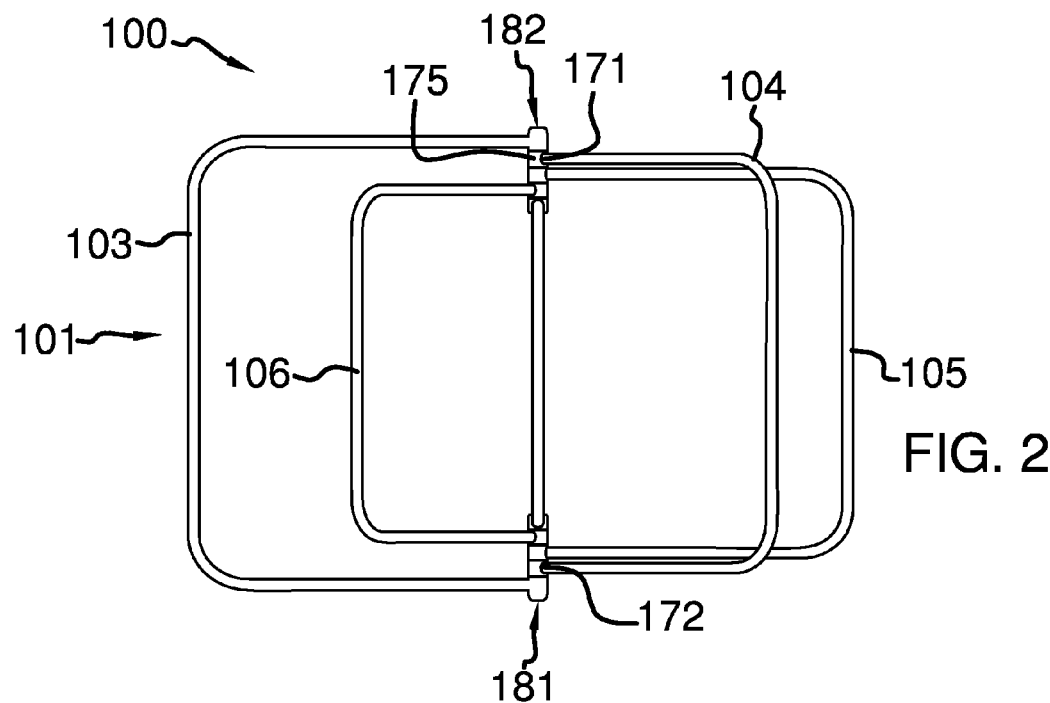
FIG. 2 is a top view of an embodiment of the disclosure.
Figure 6:
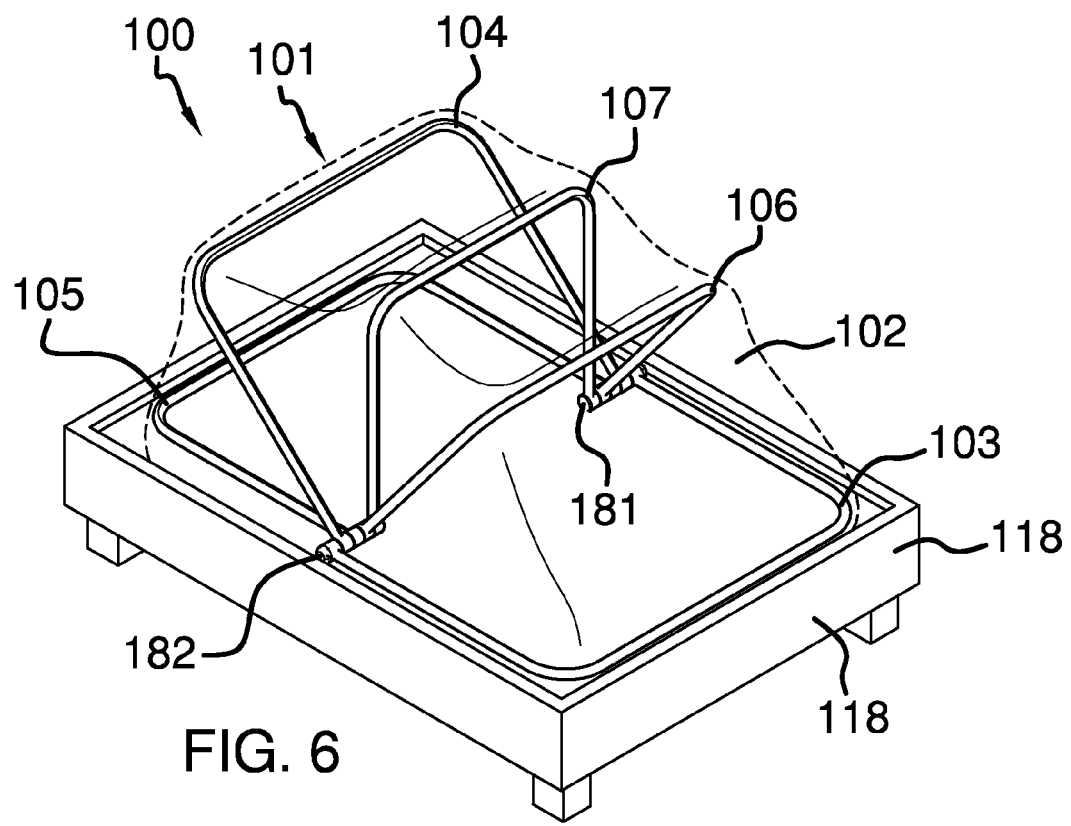
FIG. 6 is an in use view of an embodiment of the disclosure.

When the invention 100 is placed on the ground in the closed position, as shown in FIG. 3, each of the plurality of U shaped posts are in what is considered a position of 180 degrees. As shown in FIGS. 1, 2, and 6, when in use the plurality of U shaped posts 120 are placed in their working positions. The specific working positions of the first potential embodiment are: the first U shaped post 103 remains at a 180 degree position, the second U shaped post 104 is moved to a 45 degree position, the third U shaped post 105 is moved to the 0 degree position, the fourth U shaped post 106 is moved to the 135 degree position and the fifth U shaped post 107 is moved to the 90 degree position.

Figure 4:
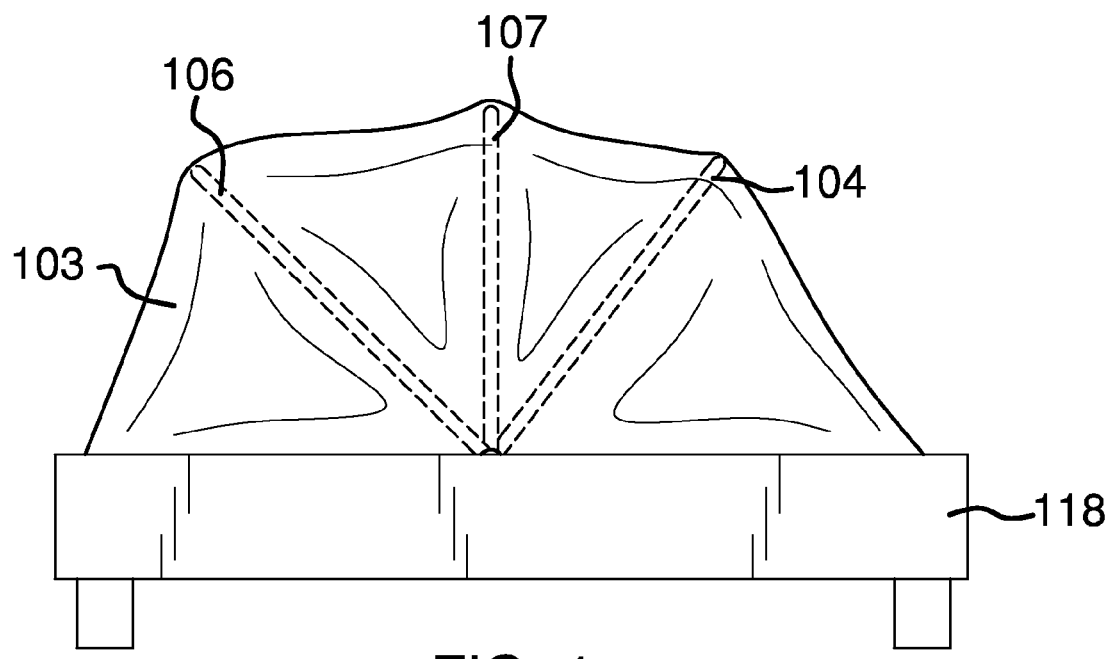
FIG. 4 is a side view of an embodiment of the disclosure.
Figure 5:
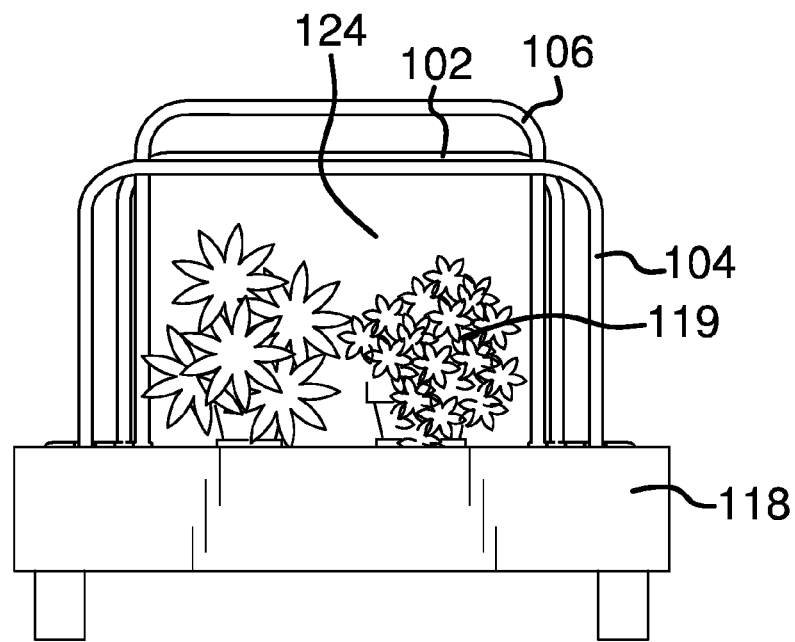
FIG. 5 is a top view of an embodiment of the disclosure.

As shown in FIG. 4, a fitted cover 102 is then placed over the collapsible frame 101 to create the protective physical space 124. As shown in FIGS. 4 and 6, to be effective, the collapsible frame 101 must be assembled over a plant bed or plant bed base 118. To be protected, the plants 119 must be contained within the protective physical space 124.

To use the invention 100, the collapsible frame 101 is placed at the edge of the plant bed base 118. The plurality of U shaped posts 120 are moved into their working positions and are locked into place. The cover 102 is then placed over the collapsible frame 101 and secured to the collapsible frame 101.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A greenhouse comprising a collapsible frame and a cover wherein:
    the collapsible frame comprises a plurality of U shaped posts, a plurality of hinges, a first shaft, and a second shaft;
    wherein the cover is secured to the collapsible frame in order to create a protective physical space that is adapted to enclose and protect plants from the elements;
    wherein the plurality of U shaped posts is further defined as a first U shaped post, a second U shaped post, a third U shaped post, a fourth U shaped post, and a fifth U shaped post;
    wherein the plurality of hinges is further defined as a first hinge, a second hinge, a third hinge, a fourth hinge, fifth hinge, sixth hinge, seventh hinge, eighth hinge, ninth hinge, tenth hinge;
    wherein each of the plurality of U shaped posts is made of tubing that is formed with rounded corners; wherein each of the plurality of U shaped posts has a first end and a second end;
    wherein a length of each of the plurality of U shaped posts is the distance along the tubing from the first end to the second end of each U shaped post;
    wherein a length of the first U shaped post is greater than the length of the second U shaped post, which is greater than the length of the third U shaped post, which is greater than the length of the fourth U shaped post, which is greater than the length of the fifth U shaped post; wherein the differences in lengths allow the plurality of U shaped posts to nest within each other;
    wherein the first end of each of the plurality of U shaped posts is attached to one of the plurality of hinges;
    wherein the second end of each of the plurality of U shaped posts is attached to a corresponding one of the plurality of hinges;
    wherein each end of each of the plurality of U shaped posts is affixed to a collar provided with each of the plurality of hinges.

2. The greenhouse according to claim 1 wherein the plurality of U shaped posts rotate around a first shaft and a second shaft.

3. The greenhouse according to claim 2 wherein the first end of the first U shaped post is attached to the first hinge; wherein the second end of the first U shaped post is attached to the second hinge.

4. The greenhouse according to claim 3 wherein the first end of the second U shaped post is attached to the third hinge; wherein the second end of the second U shaped post is attached to the fourth hinge.

5. The greenhouse according to claim 4 wherein the first end of the third U shaped post is attached to the fifth hinge; wherein the second end of the third U shaped post is attached to the sixth hinge.

6. The greenhouse according to claim 5 wherein the first end of the fourth U shaped post is attached to the seventh hinge; wherein the second end of the fourth U shaped post is attached to the eighth hinge.

7. The greenhouse according to claim 6 wherein the first end of the fifth U shaped post is attached to the ninth hinge; wherein the second end of the fifth U shaped post is attached to the tenth hinge.

8. The greenhouse according to claim 7 wherein the first hinge, the third hinge, the fifth hinge, the seventh hinge, and the ninth hinge pivot around the first shaft.

9. The greenhouse according to claim 8 wherein the second hinge, the fourth hinge, the sixth hinge, the eighth hinge, and the tenth hinge pivot around the second shaft; wherein the first U shaped post remains at a 180 degree position, the second U shaped post is moved to a 45 degree position, the third U shaped post is moved to the 0 degree position, the fourth U shaped post is moved to the 135 degree position and the fifth U shaped post is moved to the 90 degree position.

\* \* \* \* \*